United States Patent
Post et al.

(10) Patent No.: US 8,783,021 B2
(45) Date of Patent: Jul. 22, 2014

(54) METHOD FOR OPERATING AN INTERNAL COMBUSTION ENGINE AND APPARATUS FOR THE IMPLEMENTATION OF THE METHOD

(75) Inventors: Christian Post, Stuttgart (DE); Andreas Nagel, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 603 days.

(21) Appl. No.: 12/398,028

(22) Filed: Mar. 4, 2009

(65) Prior Publication Data

US 2009/0229255 A1    Sep. 17, 2009

(30) Foreign Application Priority Data

Mar. 11, 2008    (DE) .......................... 10 2008 000 602

(51) Int. Cl.
*F01N 3/00*    (2006.01)
*F01N 3/02*    (2006.01)
*F01N 1/00*    (2006.01)

(52) U.S. Cl.
USPC ................... 60/295; 60/274; 60/285; 60/297; 60/311; 60/324

(58) Field of Classification Search
USPC .................... 60/274, 285, 295, 297, 311, 324
See application file for complete search history.

(56) References Cited

U.S. PATENT DOCUMENTS 7,721,534 B2    5/2010 Sato et al.

FOREIGN PATENT DOCUMENTS

| DE | 199 06 287 | 8/2000 |
|----|-----------|--------|
| DE | 100 62 270 | 6/2002 |
| DE | 101 08 720 | 9/2002 |
| DE | 103 33 441 | 2/2004 |
| DE | 10 2004 033 414 | 2/2006 |
| JP | 2003-239724 | * 8/2003 |

* cited by examiner

*Primary Examiner* — Thomas Denion
*Assistant Examiner* — Diem Tran
(74) *Attorney, Agent, or Firm* — Kenyon & Kenyon LLP

(57) ABSTRACT

A method for operating an internal combustion engine is proposed, in whose exhaust gas zone a particle filter is disposed, which is cyclically loaded with particles and thermally regenerated, as well as an apparatus for the implementation of the method, which prevents thermal overload of the particle filter after turning off the internal combustion engine. A test is made when the internal combustion engine is turned off to determine whether an exothermal reaction takes place. Provided that an exothermal reaction takes place in the particle filter, a butterfly valve is closed, which prevents exhaust gas flow through the particle filter and, if the circumstances arise, a resulting oxygenation ingress in the particle filter.

8 Claims, 1 Drawing Sheet

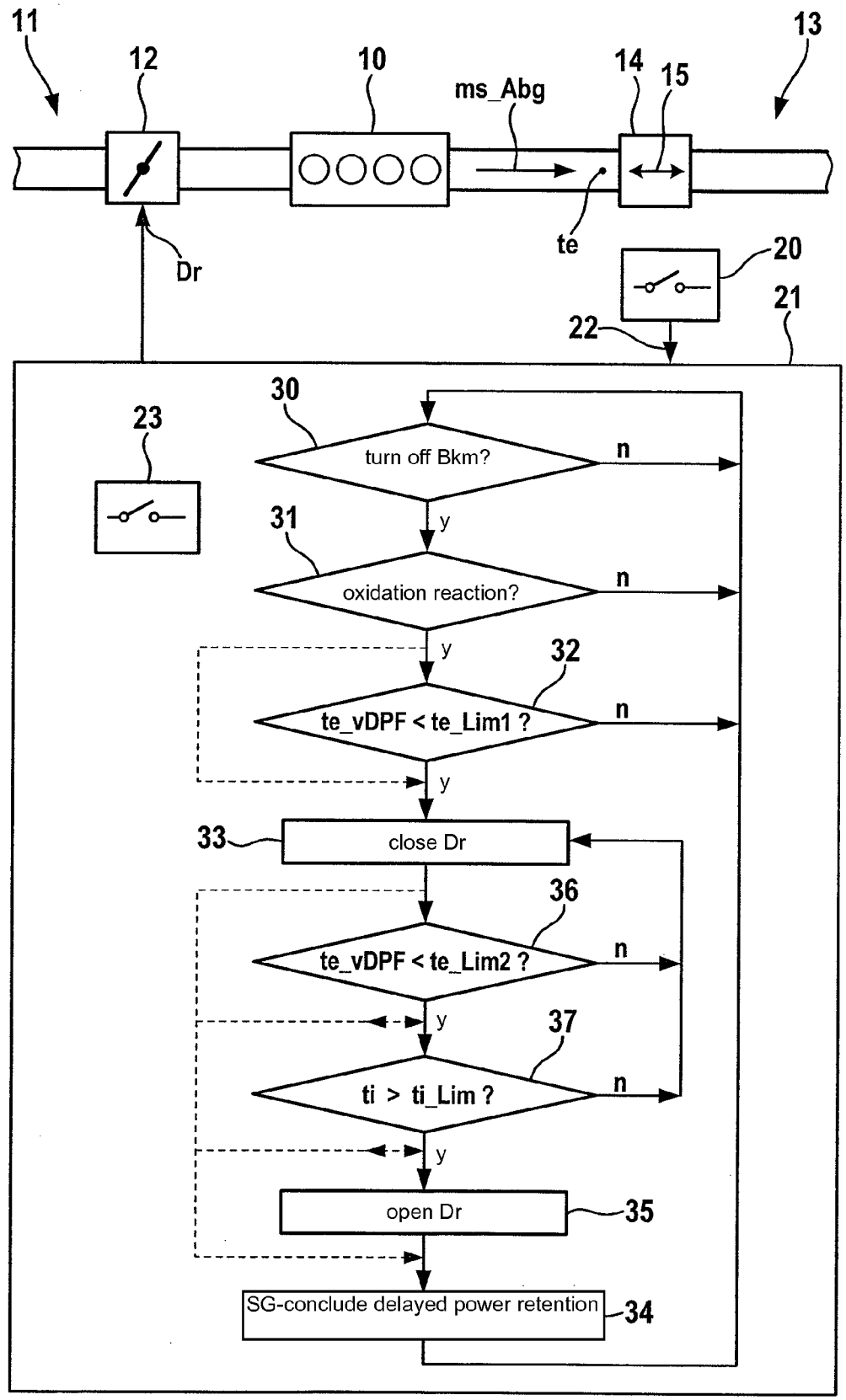

METHOD FOR OPERATING AN INTERNAL COMBUSTION ENGINE AND APPARATUS FOR THE IMPLEMENTATION OF THE METHOD

The invention is based on a method for operating an internal combustion engine, in whose exhaust gas zone a particle filter is disposed, and on an apparatus for the implementation of the method according to the class of independent claims.

The subject matter of the invention at hand is also a control unit program as well as a control unit program product.

TECHNICAL FIELD

In the German patent DE 199 06 287 A1, a method for operating a particle filter of an internal combustion engine is described, which is regenerated when required. Without conditioning of the particles the particles oxidize from a temperature of approximately 550° C. onwards. The required particle ignition temperature can be obtained with a reagent substance, such as unburned hydrocarbons, which is introduced into the exhaust gas zone of the internal combustion engine, exothermally reacts on a catalytically active surface and thereby increases the exhaust gas temperature upstream from the particle filter.

In certain operating states of the internal combustion engine, it is possible that the regeneration runs uncontrollably fast, due to an increased oxygen content of the exhaust gas. The extremely exothermal oxidation of the particles can lead to an inadmissibly high increase of temperature in the particle filter. To avoid such a condition, it has been proposed in the German patent DE 103 33 441 A1 to influence the particle burning rate by means of the exhaust gas lambda. A nominal value for a lambda signal or a nominal value for a change in the lambda signal, which is compared to the measured exhaust lambda, is specified. As a function of the deviation between the nominal and the actual value, an activation signal for an actuator, which influences the oxygen concentration in the exhaust gas, is provided. Provision can be made, for example, for an exhaust gas recirculation valve, a throttle valve etc. to be used as the actuator.

A method for controlling an internal combustion engine is also described in the German patent DE 101 08 720 A1, a particle filter, which is regularly regenerated, being disposed in an exhaust gas zone of the internal combustion engine. Based on an operating parameter of the internal combustion engine and/or the particle filter, a parameter is determined, which reflects a measurement for the intensity of the exothermal reaction in the particle filter during regeneration. If the intensity-parameter exceeds a threshold value, measures for reducing the oxygen concentration in the exhaust gas are taken, so as to decrease the particle burning rate.

An additional method for controlling an internal combustion engine is described in the German patent DE 199 06 287 A1, in whose exhaust gas zone a particle filter is disposed. The temperature increase for starting the regeneration of the particle filter is achieved through a reagent substance, which is introduced into the exhaust gas zone of the internal combustion engine upstream from the particle filter. Provision is made for fuel to be the reagent substance, which exothermally reacts in the exhaust gas zone, for example on the catalytically active surface of a catalytic converter. The fuel enters the exhaust gas zone by means of a displacement of the point of injection time, which leads to an incomplete combustion of the fuel.

The introduction of fuel into the exhaust gas zone can, according to the German patent DE 10 2004 033 414 A1, be initiated alternately or in addition to the displacement of the point of injection time by at least one fuel afterinjection. Provision is made for at least one initial and at least one second afterinjection. The initial fuel afterinjection deals with a fuel afterinjection that is attached to the fuel main injection, whereat the injected fuel only still partially combusts, so that non-combusted fuel enters into the exhaust gas zone.

The second fuel afterinjection deals with a late fuel afterinjection, whereat the fuel does not combust any more and to a large extent enters the exhaust gas zone.

According to the German patent DE 199 06 287 A1, the depletion of a particle filter can be ascertained by, for example, determining the differential pressure present at the particle filter.

In the German patent DE 100 62 270 A1, a method for the regeneration of a particle filter disposed in an internal combustion engine has been proposed, with which the particle filter can be regenerated while the internal combustion engine is turned off. Provision is made in a method to electrically heat the particle filter in order to obtain the temperature required for regeneration. Since the known method is implemented while the internal combustion engine is turned off, interventions into the engine's interior to increase the exhaust gas temperature or to introduce a reagent substance into the exhaust gas zone, respectively separate devices for the introduction of the reagent substance into the exhaust gas zone, are not required.

Underlying the invention is the task to specify a method for operating an internal combustion engine, in whose exhaust gas zone a particle filter is disposed, and to specify a device for the implementation of the method, which avoids the overheating of the particle filter after turning off the internal combustion engine.

SUMMARY

The invention is based on a method for operating an internal combustion engine, in whose exhaust gas zone a particle filter is disposed, which is cyclically loaded with particles and thermally regenerated.

Provision is made in a procedural approach according to the invention, for a test to be made when the internal combustion engine is being turned off, to determine whether an exothermal reaction takes place in the particle filter. Furthermore, provision is made for a butterfly valve to be closed when an exothermal reaction takes place, which prevents exhaust gas flow through the particle filter.

The procedural approach according to the invention with the characteristics of the independent procedural claim has the advantage that the internal combustion engine can be turned off without danger of subsequent overheating of the particle filter.

The closing of the butterfly valve prevents exhaust gas flow through the particle filter and consequently, if the circumstances arise, a possible oxygen supply, which could further ignite an exothermal reaction taking place in the particle filter, and could lead to the overheating of the particle filter.

Advantageous modifications and configurations of the procedural approach according to the invention become apparent in the dependent claims.

Provision is made in a configuration for the exothermal reaction in the particle filter to thereby be detected, so that a regeneration process of the particle filter takes place.

Provision is made in an alternate or additional configuration for a test to be made to determine whether at least one measurement of the temperature in the particle filter and/or upstream and/or downstream from said filter exceeds a temperature threshold value.

Provision is made in a configuration to reopen the butterfly valve once the measurement of the temperature undershoots the temperature threshold value. This temperature threshold value can deviate from the temperature threshold value, whereat the butterfly valve is closed when said value has been exceeded.

Provision is made in an alternate or additional configuration to reopen the butterfly valve, if a time duration has elapsed after the butterfly valve has closed.

Provision is made in a different configuration to conclude a control unit delayed power retention after the butterfly valve has closed by switching off the power supply of the control unit. The maintenance of the power supply of the control unit after turning off the internal combustion engine, which is required for the procedural method to be implemented, is being concluded with this measure.

The device according to the invention for the implementation of the method initially concerns a specifically customized control unit, which provides means for the implementation of the method.

A throttle valve disposed in the air intake zone of the internal combustion engine can preferably be used as the butterfly valve.

The control unit preferably contains at least one electronic memory, wherein the steps of the method are deposited.

Provision is made in a control unit program according to the invention for all steps of the procedural method to be implemented if it runs in a control unit.

The control unit program product according to the invention with a program code stored on a machine-readable carrier implements the method according to the invention, if the program runs in a control unit.

Further advantageous modifications and configurations of the procedural approach according to the invention become apparent in additional dependent claims. Examples of embodiment of the invention are depicted in the drawing and explained in detail in the following description.

SHORT DESCRIPTION OF THE FIGURES

The FIGURE shows a technical environment, wherein a method according to the invention is running, as well as a flowchart.

DETAILED DESCRIPTION OF THE EXAMPLES OF EMBODIMENTS

The FIGURE shows an internal combustion engine 10, in whose intake area 11 a butterfly valve 12 is disposed and in whose exhaust gas zone 13 a particle filters 14 is disposed. An exhaust gas flow ms_Abg occurs in the exhaust gas zone 13. Furthermore a temperature te occurs in the exhaust gas zone 13.

An internal combustion engine operating switch 20 provides a switching signal for the control unit 21. The control unit 21 provides a butterfly valve signal Dr to the butterfly valve 12.

The control unit 21 contains a control unit power supply switch 23, which turns the power supply for the control unit 21 on or off.

The method according to the invention is further explained with the aid of the flowchart shown in the control unit 21:

In an initial query 30, a test is made to determine whether the internal combustion engine 10 is being turned off. The test takes place with the aid of the switching signal 22, which is provided by the internal combustion engine operation switch 20. The internal combustion engine operation switch 20 generally consists of a switch operated mechanically with an ignition key or electronically, for the start-up or turning-off of the internal combustion engine 10.

Provided that in the initial query 30, it has been determined that the internal combustion engine should be turned off, a second query 31 is made to determine whether an exothermal reaction takes place in the particle filter 14. Such an exothermal reaction takes place, when the particle filter 14 is being regenerated. During the regeneration of the particle filter 14, the particles which have been deposited in the particle filter 14 while the internal combustion engine 10 is operated are burned up. The burning takes place by means of an oxidation of the particles with the oxygen present in the exhaust gas flow ms_Abg. To start up the regeneration, an increased temperature of the exhaust gas flow ms_Abg upstream from the particle filter 14, which lies at approximately 550° C. without further conditioning of the exhaust gas particles, is required. After starting up the regeneration of the particle filter 14, additional heating of the particle filter 14 can be required, in spite of the exothermally running reaction, due to heat loss through the exhaust gas flow ms_Abg, heat radiation as well as heat convection. Measures for the implementation of the regeneration are described in the aforementioned technical field.

During operation of the internal combustion engine 10, the regeneration of the particle filter 14 can be influenced in such a way that overheating caused by an excess supply of oxygen is avoided, by means of the targeted specified operation of the internal combustion engine 10, especially by adjusting the exhaust gas lambda and the temperature of the exhaust gas flow ms_Abg upstream from the particle filter 14.

After turning off the internal combustion engine 10, situations can, however, arise, in which an increase of the oxygen concentration in the particle filter 14 has to be expected.

The combustion in the internal combustion engine 10 is generally controlled by valves, which are not shown in detail in the figure. After turning off the internal combustion engine 10, the valves can remain in a position in which a valve-opening overlap occurs in one or at a plurality of cylinders of the internal combustion engine, whereat an intake valve and an exhaust valve are open at the same time. Provided that the butterfly valve 12, which is, in the example of embodiment shown, implemented in the form of a throttle valve disposed in the air intake zone 11 of the internal combustion engine 10, is opened at the same time, a continuously open channel is present between the air intake zone 11 and the back end of the exhaust gas zone 13, which can lead to an exhaust gas flow 15 in the particle filter 14. The exhaust gas flow 15 in the particle filter 14 is facilitated by the particle filter, which is heated up. A stack effect can occur, where especially ambient air from the back of the exhaust gas zone 13 is drawn in. Due to the high amount of oxygen and the comparatively low exhaust gas flow 15, the thermal reaction (oxidation) of the deposited particles can become so severe that thermal damage to the particle filter 14 can no longer be ruled out.

Provided that in a second query 31, it has been determined that an exothermal reaction takes place in the particle filter 14, the butterfly valve 12 is closed according to the first functional block 32. The closing of the butterfly valve 12 prevents the exhaust gas flow 15 to occur in the particle filter 14. In principle, the butterfly valve 12 could be disposed downstream from the particle filter 14 or upstream in front of said filter in the exhaust gas zone 13. Provided that such an exhaust gas valve is in place, this butterfly valve 12 can be used for closing. The example of embodiment shown is based on the butterfly valve 12 being implemented as a throttle valve disposed in the air intake zone 11 of the internal combustion engine 12. The first functional block 32 causes the butterfly valve signal Dr to be provided, with which the butterfly valve 12 is closed.

An exothermal reaction in the particle filter 14 occurs, for example, if the particle filter 14 is being regenerated. In this case, a test is made in the second query to determine whether such a regeneration process is now taking place or whether such a regeneration process has been recently concluded, so that an exothermal reaction in the particle filter 14 has to be expected.

Additionally or alternately, provision can be made for a test to be made in the third query 32, the measurement of the temperature te being compared with a temperature threshold value te_Lim1. The measurement for the temperature te can be acquired as the measurement for the temperature in the particle filter 14 and/or upstream in front of the particle filter 14 and/or downstream from the particle filter. The measurement for the temperature te is preferably calculated with the aid of operating parameters of the internal combustion engine 10 and/or the particle filter 14 and/or parameters of the exhaust gas flow ms_Abg.

Provided that in the initial and/or the second query 31, 32, it has been determined that an exothermal reaction takes place in the particle filter, the first functional block 32 causes the closing of the butterfly valve 12. This measure reliably prevents the exhaust gas flow 15 in the particle filter and thereby a possible oxygen ingress. In principle, the method according to the invention, for which provision has been made, can be considered concluded.

Preferably, a second functional block 34 subsequently defines an opening of a control unit power supply switch, whereby the control unit delayed power retention is concluded.

Provision is made in a different configuration for the butterfly valve 12 to be reopened according to the specification of a third functional block 35. The opening can, for example, be caused when the measurement of the temperature te undershoots a temperature threshold value te_im2. Comparison between the temperature te and the temperature threshold value te_Lim2 takes place in the forth query 36. The temperature threshold value te_Lim2 can deviate from a different temperature threshold value te_Lim1, above which the butterfly valve 12 is being closed.

Alternately or additionally, provision can be made, according to the fifth query 37, for a test to be made to determine whether a time duration ti_Lim has elapsed during which the butterfly valve 12 is closed. If the time ti exceeds the time duration ti_Lim, the butterfly valve 12 is reopened.

The invention claimed is:

1. A method of operating an internal combustion engine having a particle filter arranged in an exhaust gas zone, wherein the particle filter is cyclically loaded with particles and thermally regenerated, the method comprising:
   turning the internal combustion engine off so that the internal combustion engine stops;
   performing a test to determine if an exothermal reaction is taking place in the particle filter, wherein the test comprises determining whether at least one measurement of a temperature in the particle filter upstream or downstream exceeds a temperature threshold value;
   closing a butterfly valve upon a determination that an exothermal reaction is taking place, wherein the closed butterfly valve prevents an exhaust gas flow through the particle filter;
   first determining if a measurement of a temperature in the exhaust gas zone undershoots a second temperature threshold value;
   when the measurement undershoots the second temperature threshold value, reopening the butterfly valve;
   second, if the butterfly valve is closed, determining if a time duration has elapsed after the closing of the butterfly valve; and
   when the time duration has elapsed, reopening the butterfly valve.

2. The method according to claim 1, further comprising upon detecting an exothermal reaction in the particle filter, performing a regeneration process of the particle filter.

3. The method according to claim 1, further comprising detecting the exothermal reaction in the particle filter by a test to determine whether a measurement for the temperature in the exhaust gas zone exceeds the temperature threshold value.

4. The method according to claim 1, further comprising concluding a control unit delayed power retention after closing of the butterfly valve.

5. An apparatus for operating an internal combustion engine, comprising at least one customized control unit to implement a method of operating an internal combustion engine having a particle filter arranged in an exhaust gas zone, wherein the particle filter is cyclically loaded with particles and thermally regenerated, the method comprising: turning the internal combustion engine off so that the internal combustion engine stops; performing a test to determine if an exothermal reaction is taking place in the particle filter, wherein the test comprises determining whether at least one measurement of a temperature in the particle filter upstream or downstream exceeds a temperature threshold value; closing a butterfly valve upon a determination that an exothermal reaction is taking place, wherein the closed butterfly valve prevents an exhaust gas flow through the particle filter; first determining if a measurement of a temperature in the exhaust gas zone undershoots a second temperature threshold value; when the measurement undershoots the second temperature threshold value, reopening the butterfly valve; second, if the butterfly valve is closed, determining if a time duration has elapsed after the closing of the butterfly valve; and when the time duration has elapsed, reopening the butterfly valve.

6. The apparatus of claim 5, wherein a throttle valve is disposed in an air intake zone of the internal combustion engine, wherein the throttle valve functions as the butterfly valve.

7. A control unit program product with a program code stored on a non-transitory machine-readable carrier to implement, if executed on a control unit, all the steps of a method of operating an internal combustion engine having a particle filter arranged in an exhaust gas zone, wherein the particle filter is cyclically loaded with particles and thermally regenerated, the method comprising: turning the internal combustion engine off so that the internal combustion engine stops; performing a test to determine if an exothermal reaction is taking place in the particle filter, wherein the test comprises determining whether at least one measurement of a temperature in the particle filter upstream or downstream exceeds a temperature threshold value; closing a butterfly valve upon a determination that an exothermal reaction is taking place, wherein the closed butterfly valve prevents an exhaust gas flow through the particle filter; first determining if a measurement of a temperature in the exhaust gas zone undershoots a second temperature threshold value; when the measurement undershoots the second temperature threshold value, reopening the butterfly valve; second, if the butterfly valve is closed, determining if a time duration has elapsed after the closing of the butterfly valve; and when the time duration has elapsed, reopening the butterfly valve.

8. A control unit program product with a program code stored on a non-transitory machine-readable carrier to implement, if the program is executed in a control unit, a method of operating an internal combustion engine having a particle filter arranged in an exhaust gas zone, wherein the particle filter is cyclically loaded with particles and thermally regenerated, the method comprising: turning the internal combustion engine off so that the internal combustion engine stops; performing a test to determine if an exothermal reaction is taking place in the particle filter, wherein the test comprises determining whether at least one measurement of a temperature in the particle filter upstream or downstream exceeds a temperature threshold value; and closing a butterfly valve upon a determination that an exothermal reaction is taking place, wherein the closed butterfly valve prevents an exhaust gas flow through the particle filter; first determining if a measurement of a temperature in the exhaust gas zone undershoots a second temperature threshold value; when the measurement undershoots the second temperature threshold value, reopening the butterfly valve; second, if the butterfly valve is closed, determining if a time duration has elapsed after the closing of the butterfly valve; and when the time duration has elapsed, reopening the butterfly valve.

\* \* \* \* \*